3,087,539
PREFLOOD-SECONDARY RECOVERY WATER
TECHNIQUE
John J. Maurer, Jr., Roselle, N.J., assignor to Jersey Production Research Company, a corporation of Delaware
No Drawing. Filed Jan. 18, 1960, Ser. No. 2,815
12 Claims. (Cl. 166—9)

The present invention is broadly concerned with a preflood secondary recovery process for the more effective and efficient recovery of oil from subterranean reservoirs. The invention is particularly directed to a secondary recovery operation wherein a fluid such as water is employed as a driving medium. The invention is especially concerned with an improved type of viscous waterflooding process in which fingering and oil reservoir bypassing on the part of the driving fluid are substantially reduced by the utilization of a particular class of water thickening agents wherein salt solutions are used to preflood the reservoir and thus reduce viscosity loss during the viscous waterflooding operation. Particularly desirable materials for preflooding and for preventing viscosity loss of the subsequent flood are water soluble salt solutions, such as ammonium salts and sodium salts.

In the recovery of oil from subterranean reservoirs, there have been substantial advances in primary recovery techniques so as to substantially increase the recovery of oil. However, an appreciable quantity of the oil remains in the reservoir after termination of the primary recovery methods. In general, it is estimated that only about 10 to 30% of the oil can be economically recovered by primary recovery techniques. A greater amount may be recovered by other secondary techniques, such as repressuring treatments following the primary method.

Thus, there exists a great interest in secondary recovery methods. Secondary recovery is the recovery of additional quantities of oil from a reservoir after it is no longer economical to recover oil by primary recovery methods. For example, a secondary operation may be conducted by drilling one or more injection wells into a permeable oil bearing formation within suitable proximity to a producing well or wells which are drilled into this same permeable oil bearing formation. Injection of liquids or gases through the injection well is generally effective in increasing the oil production from the producing well or wells. This technique of secondary recovery enables the recovery of substantially more oil than can be produced by primary recovery methods.

As pointed out, the use of a number of secondary recovery procedures for removing oil from subterranean oil reservoirs are well known in the petroleum industry. It is the function of such procedures to make possible the recovery of oil from reservoirs after primary production methods are uneconomical. In general, all secondary recovery procedures employ a driving medium such as a liquid or gas for displacing additional oil from a reservoir. The displacing medium, usually a fluid, is injected in a reservoir as by means of one or more of the original wells or by means of entirely new wells; and the oil in the reservoir is displaced toward and withdrawn from other remaining wells.

Due partially to its ready availability in many regions, water has been extensively employed as a driving medium in secondary oil recovery programs.

While conventional waterflooding is effective in obtaining additional oil from subterranean oil reservoirs, it has a number of shortcomings which detract seriously from its value. Foremost among these shortcomings is a tendency of flood water to "finger" through a reservoir and to bypass substantial portions of the reservoir. In other words, a water drive has a less than perfect "sweep efficiency" in that it does not contact all portions of the reservoir. Furthermore, it does not normally displace as much oil in the portions of the reservoir which it contacts as it theoretically is capable of doing.

The fingering tendency of a waterflood is usually explained by the fact that oil reservoirs possess regions and strata that have different permeabilities. The water flows more rapidly through those regions and strata having a greater relative permeability to water than in other portions of the reservoir. Waterflooding often completely misses substantial portions of the reservoir. The net result is an inefficient oil displacement action on the part of the water.

At this point, it should be noted that crude oils vary greatly in viscosity—some being as low as 1 or 2 c.p.s. and some ranging up to 1000 c.p.s. or even more. It has been established that waterflooding performs less satisfactorily with viscous crude oils than with relatively non-viscous oils. In other words, the fingering and bypassing tendencies of the water drive are more or less directly related to the ratio of the viscosity of the reservoir oil to the viscosity of the aqueous driving medium.

Also of interest at this point is a mathematical relationship that has been developed in recent years to help explain the behavior of fluids flowing through porous media such as oil reservoirs. When this equation is applied to a flooding operation or the like within an oil reservoir, it reads as follows:

$$\frac{M_o}{M_e} = \frac{\mu e}{\mu o}, \frac{K_o}{K_e}$$

where $M_o$ is the mobility of the oil to the reservoir in question
$M_e$ is the mobility of the flooding medium to the reservoir in question
$\mu o$ is the viscosity of the driven oil
$\mu e$ is the viscosity of the flooding medium
$K_e$ is the relative permeability of the reservoir toward the flooding medium in the presence of residual oil
$K_o$ is the relative permeability of the reservoir toward the oil in the presence of connate water.

This equation is perhaps best explained by stating that when the mobility ratio of oil to the driving fluid within the reservoir is equal to one, the oil and driving fluid move through the reservoir with equal ease. Substantially equilibrium proportions of driving fluid and oil remain within the reservoir as soon as the driving fluid has passed therethrough. Expressed otherwise, the mobility ratio term affords a measure of the volume of driving fluid and the amount of time that is required to reduce the oil content of the reservoir to an ultimate equilibrium value. For example, a given volume of driving fluid operated at a mobility ratio of one or greater will displace a markedly greater volume of oil from a reservoir than will an equal volume of driving fluid operating at a mobility ratio of less than one.

Several procedures have been suggested to date for improving the mechanics of waterflooding procedures particularly with the view to reducing the degree of fingering and bypassing. One suggestion has been to increase the viscosity of the water drive relative to the oil by incorporating water soluble viscous agents within the water. Materials that have been suggested for this purpose include a wide variety of naturally occurring gums, sugars and polymers. While these materials are effective to an extent in increasing the viscosity of flood water, they are also characterized by serious disadvantages. For example, some of the materials have a tendency to plug formations; some are relatively unstable; and some have relatively little thickening effect. Additionally many of these materials are quite expensive and their use is not feasible from the standpoint of economics.

Accordingly, it is an object of this invention to provide an improved type of displacement process in which a marked increase in the viscosity of the driving fluid may be readily attained. It is also an object of the invention to provide a viscous "waterflooding" process in which the increased viscosity of the flood water is attained inexpensively. It is still a further object of the invention to use a driving fluid whose viscosity is stable.

In accordance with the specific adaptation of the present invention, improved classes of water thickening agents are utilized wherein salt solutions are used in a preflood in order to reduce viscosity loss of the subsequent flood during the viscous waterflooding operation.

The preferred water thickening agents wherein preflood salt solutions are used are, for example, selected from the class of compounds comprising sulfonated polymers. Particularly desirable polymers are polyvinyl aromatic sulfonates as, for example, polyvinyl toluene sulfonates.

These water thickening agents comprise sulfonated polymers as, for example, polyvinyl toluene sulfonates, polystyrene sulfonates, or substituted polystyrene sulfonates.

These agents have the following structural formula:

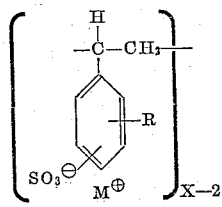

where: R represents H, $CH_3$ or a group for which the Hammett function is known or readily determinable. (See Physical Organic Chemistry by J. Hine, published by Wiley and Co., New York.) (X) represents the degree of polymerization and has values such that the molecular weight of the resulting polymer is greater than 100,000.

$M^{\oplus}$ represents a cationic salt component and may be

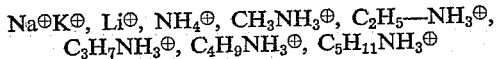

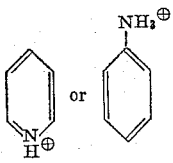

or other amine.

The relative substituent position of R to $-SO_3^{\ominus}M^{\oplus}$ to the styryl group is considered to be non-limiting except by reason of ease of preparation. Thus, for example, in the case of polyvinyl toluene sulfonate prepared by polymerization of a mixed ortho and para vinyl toluene monomer, as is generally commercially supplied, the sulfonate would enter respective positions along the chain in accordance with the generally well established rules of organic chemistry; each position being determined by the relative positions already occupied on the aromatic nucleus by the polymer backbone and the methyl group. In the case of polystyrene, the sulfonate would enter ortho and para to the position linked to the polymer backbone.

In preparing the basic polymer for subsequent sulfonation, a wide range of molecular weights can be produced by variation of such factors as catalyst, temperature and type of polymerization; that is, whether polymerization is performed by solution, bulk or emulsion techniques.

In general, it is preferable to use emulsion methods since these methods produce higher molecular weights at more rapid rates. Many emulsion polymers may be prepared using the following formulations:

(A) 100 cc. $H_2O$:
52 monomer (vinyl toluene)
3.0 cc. sulfated aryl ether soap
0.25 g. azobisisobutyronitrile catalyst
   (B) Same as above but using:
0.25 g. potassium persulfate catalyst and
0.10 g. sodium bisulfite activator in place of the azobisisobutyronitrile catalyst
   (C) Same as (A) but using:
0.150 g. cumene hydroperoxide catalyst and
0.075 g. sodium bisulfite activator in place of the azobisisobutyronitrile catalyst.

The above may be repeated using styrene as the monomer.

The formulations may be either (1) Canned under nitrogen atmosphere and run at 46° C. (or other temperature above room temperature) in a constant temperature apparatus with agitation (i.e. a laundrometer).

(2) Placed under nitrogen atmosphere in a bottle and shaken at room temperature.

After the monomer is polymerized, the slurry is diluted with 400 cc. of $H_2O$ and the polymer is coagulated by adding 15 grams of NaCl. The product is filtered and washed until no positive test for chloride could be obtained with the wash liquor. The product is dried in a vacuum oven at 65° C. and 200 mm. pressure for 12–15 hours.

Other desirable water thickening agents, for example, to be used in conjunction with preflood salt solutions are secured by copolymerizing vinyl aromatics, such as styrene, vinyl toluene, vinyl naphthalene and the like with maleic anhydride. These materials are obtained in high molecular weights by using azobisisobutyronitrile as catalyst, and polymerizing at low temperatures, such as 30°–60° C. Other catalysts can be used, such as benzoyl peroxide and cumene hydroperoxide.

Specific vinyl aromatics exemplifying monomers that may be copolymerized with maleic anhydride are as follows: styrene, vinyl toluene, α-methyl styrene, p-chlorostyrene, dichlorostyrene, vinylnaphthalene, trans-stilbene, α,α-diphenylethylene, isoallylbenzene, vinylcarbazole and vinyl ferrocene.

The styrene may be copolymerized with maleic anhydride in methyl ethyl ketone at 60° C. using 0.036 gram of azobisisobutyronitrile as catalyst per mole of monomers. The copolymer is precipitated from methyl ethyl ketone solution with methanol, and then hydrolyzed by dissolving in dilute aqueous sodium hydroxide.

The molecular weights of the thickening polymers should be in excess of about 100,000. In general, preferred polymers should be above about 500,000, preferably, above 1,000,000. The molecular weights may be as high as 3,000,000 to 5,000,000, or up to 10,000,000 and higher. When a polymer has a molecular weight in the range from 500,000 to 1,000,000, it should be used in the concentration of less than about 1% by weight, preferably, in the range from 0.1 to 0.5% by weight. A desirable concentration is 0.3% by weight.

As mentioned heretofore, oil reservoir water[1] solutions of water thickeners suffer viscosity loss during flow through oil reservoir[2] sand. This loss is due, in part, to adsorption. This viscosity loss limits the effectiveness of a viscous waterflooding operation.

In accordance with the present invention, larger viscosity retentions are realized when viscous aqueous solu-

---

[1] Reservoir water—40 liters of water contains 2.72 grams sodium bicarbonate, 4.28 grams sodium sulfate, 5.52 grams magnesium chloride, 3.56 grams calcium chloride, 36.5 grams sodium chloride and 2.05 grams aluminum sodium sulfate—($Al_2(SO_4)_3Na_2SO_4.24H_2O$).
[2] A sand from an oil field containing 2–3% clays of different ion exchange values.

tions, for waterflooding, are used in conjunction with a salt solution preflood. As mentioned, viscosity retention of polymeric "water-thickeners" is markedly improved by the pretreatment with solutions of salts, such as ammonium salts. This pretreatment probably functions as follows: $NH_4^+$ ions exchange with $Ca^{++}$, $Mg^{++}$, etc. thus removing them from the sand. Subsequent flow of polymeric thickener solutions is more efficient due to the absence of these ions in the sand.

A number of tests were conducted using concentrated salt solutions as follows:

EXAMPLE 1

A one foot column was packed with clean, oil-free reservoir sand. (This sand was water-washed and that portion which passed through a 20 mesh sieve rejected.) The appropriate salt solution was pumped into the sand pack and allowed to stand for circa one hour. Polymer solution was then pumped into the column. In all cases a 0.25% solution of styrene-maleic anhydride in oil reservoir water was used.

Run A: distilled $H_2O$ in column first; polymer solution injected at pH=6.8
Run B: $NH_4Cl$ solution (1.4 g./200 ml. distilled $H_2O$) in column first; polymer solution injected at pH=6.9
Run C: $NH_4OAc$ solution (2.0 g./200 ml. distilled $H_2O$) in column first; polymer solution injected at pH=6.8

| Pore Volume of Polymer Solution Produced | Percent of Initial Viscosity | | |
|---|---|---|---|
| | Run A | Run B | Run C |
| .25 | 49.3 | 75.6 | 64.5 |
| .50 | 66.3 | 85.0 | 96.8 |
| .75 | 70.8 | 100 | 107 |
| 1.00 | 81.4 | 97.2 | 111 |

Additional tests were made to determine the effect of a preflood salt solution in reducing the viscosity loss during the viscous flooding operation. The results of these tests are as follows:

EXAMPLE 2

*Pretreatment With Ammonium Salts Improves Flow Stability* a

| No preflood Initial pH: 7.0 Initial Viscosity: 6.97 cs. at 25° C. | | | Preflood with 0.9% $NH_4Cl$ solution Initial pH: 6.7 Viscosity: 6.68 cs. at 25° C. | | |
|---|---|---|---|---|---|
| Pore Volume of Polymer Solution Produced | Percent Retention | pH | Pore Volume of Polymer Solution Produced | Percent Retention | pH |
| .25 | 34 | 7.0 | .25 | 26 | 7.5 |
| .50 | 53 | 7.0 | .50 | 82 | 7.6 |
| .75 | 70 | 7.1 | .75 | 91 | 7.7 |
| 1.00 | 79 | | 1.00 | 95 | 7.7 | a Sodium salt of polyvinyl toluene sulfonate.

These data show that an ammonium chloride preflood is effective with a sulfonated polymer.

Additional tests were conducted to show that:

EXAMPLE 3

Ammonium chloride prefloods improve the sand flow stability of viscous aqueous solutions. The use of ammonium chloride solutions of dextran in the early portion of a viscous waterflood has several advantages. The ammonium ions will displace $Ca^{++}$ and $Mg^{++}$ thus improving the flow stability of polymer solutions used behind the dextran-$NH_4Cl$ bank. This nonionic polymer will be unaffected by these ions—thus the sweep efficiency of the preflood itself will be improved. This, in turn, will lead to better viscosity retention of the following ionic polymer solution which would be used throughout most of the flooding operation because of the higher thickening efficiency of ionic polymers.

*The Effect of Dextran-$NH_4Cl$ Preflood on Flow of Sulfonated Polymer* [1]

| Preflood: None Column: 6" Temp.: 25° C. | | 2% Dextran in 1% $NH_4Cl$ solution Column: 12" Temp.: 60° C. | |
|---|---|---|---|
| Pore Volume of Polymer Solution Produced | Percent Retention | Pore Volume of Polymer Solution Produced | Percent Retention |
| .50 | 48 | .50 | 87 |
| .75 | | .75 | 69 |
| 1.00 | 67 | 1.00 | 80 |

[1] Sulfonated polymer hereinbefore described.

The invention broadly covers the use of preflood salt solutions in conjunction with water thickening agents for use in secondary flooding operations. These salts may comprise inorganic salts, particularly, the ammonium salts. Organic bases, amides and polyamine solutions are also satisfactory. These salts, as mentioned, may comprise organic salts such as tetra methyl ammonium chloride, hexadecyl trimethyl ammonium chloride and the like. Preferred salts are ammonium salts and alkali metal salts. Specific satisfactory salts are sodium chloride, sodium nitrate, potassium chloride, potassium nitrate, ammonium chloride, ammonium nitrate and the sulfates of these metals, sodium iodide and other iodides of ammonium and the alkali metals are satisfactory. In general, these salts should be water soluble.

The concentrations of salts used may vary appreciably, depending upon various factors. Generally, the upper concentration of the salt should be not greater than about 2 to 4% by weight based upon the total flood used. The lower concentration of the salt is a function of the environment in which the flood is used, such as the type of clays and the type of ions present. In general, the concentration of the salt should vary in the range from about 0.2 to 0.75 weight percent based on total flood. The quantity of salt solution utilized may also vary appreciably, depending upon the nature and characteristics of the subterranean strata being traversed. In general, the quantity of salt solution used in the preflood should be sufficient to remove the ions which cause loss of viscosity in the subsequent flood.

What is claimed is:

1. An improved process for the recovery of oil from a subterranean reservoir which comprises passing an aqueous solution of a salt selected from the class consisting of alkali metal salts and ammonium inorganic salts from an input to an output well through said reservoir, the concentration of said salt being from about 0.2% to about 4% by weight, which salt is characterized by having the ability to ion exchange with calcium and magnesium in said reservoir, thereby displacing said calcium and magnesium ions, thereafter passing an aqueous solution containing an organic compound, which organic compound is characterized by having the ability to increase the viscosity of said water from said input to said output well, and which organic compound is further characterized as a high molecular weight organic polymeric material whose water solutions undergo viscosity changes in the presence of mono-, di- and trivalent salts and recovering displaced oil from said output well.

2. A process as defined by claim 1 wherein said organic compound has a molecular weight of above 200,000.

3. A process as defined by claim 1 wherein the molecular weight of said organic compound is above 500,000.

4. A process as defined by claim 1 wherein the said salt solution comprises an alkali metal salt.

5. A process as defined by claim 1 wherein said organic compound is a copolymer of a vinyl aromatic and maleic anhydride and said salt comprises an ammonium salt.

6. A process as defined by claim 1 wherein said copolymer comprises a polyvinyl toluene sulfonate and said salt comprises an ammonium salt.

7. A process as defined by claim 1 wherein said salt comprises ammonium chloride.

8. A process as defined by claim 1 wherein said agent comprises a sulfonated polymer and said salt comprises ammonium chloride.

9. A process as defined by claim 1 wherein said salt solution comprises a sodium chloride solution.

10. A process as defined by claim 1 wherein said agent comprises a sulfonated polymer and said salt comprises ammonium acetate.

11. A process as defined by claim 1 in which the salt solution is used in conjunction with a non-ionic polymer.

12. A process as defined by claim 1 wherein said salt solution comprises ammonium chloride plus dextran.

References Cited in the file of this patent

UNITED STATES PATENTS

| | | |
|---|---|---|
| 2,226,119 | De Groote et al. | Dec. 24, 1940 |
| 2,341,500 | Detling | Feb. 8, 1944 |
| 2,612,485 | Baer et al. | Sept. 30, 1952 |
| 2,733,206 | Prusick et al. | Jan. 31, 1956 |
| 2,738,325 | Rydell | Mar. 13, 1956 |
| 2,827,964 | Sandiford et al. | Mar. 25, 1958 |
| 2,842,492 | Von Engelhardt et al. | July 8, 1958 |
| 3,020,953 | Zerweck et al. | Feb. 13, 1962 |

FOREIGN PATENTS

| | | |
|---|---|---|
| 1,033,155 | Germany | July 3, 1958 |